(12) United States Patent
Kanuma

(10) Patent No.: US 8,749,828 B2
(45) Date of Patent: Jun. 10, 2014

(54) FACSIMILE APPARATUS

(75) Inventor: Daisuke Kanuma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 13/433,043

(22) Filed: Mar. 28, 2012

(65) Prior Publication Data

US 2012/0257234 A1    Oct. 11, 2012

(30) Foreign Application Priority Data

Apr. 6, 2011    (JP) ................. 2011-084829

(51) Int. Cl.
*G06F 3/12*    (2006.01)
*H04N 1/00*    (2006.01)

(52) U.S. Cl.
USPC .......... 358/1.15; 358/401; 358/403; 358/404; 358/405

(58) Field of Classification Search
None
See application file for complete search history.

(56) References Cited

U.S. PATENT DOCUMENTS

| | | | |
|---|---|---|---|
| 7,092,129 B2 * | 8/2006 | Oobayashi | 358/402 |
| 2004/0075871 A1 * | 4/2004 | Itoh | 358/440 |
| 2005/0237569 A1 * | 10/2005 | Takahashi | 358/1.15 |
| 2008/0204784 A1 * | 8/2008 | Nakashima | 358/1.13 |
| 2010/0053692 A1 | 3/2010 | Machiyama | |
| 2010/0202007 A1 * | 8/2010 | Kamekawa | 358/1.14 |
| 2011/0043867 A1 * | 2/2011 | Tonegawa | 358/442 |
| 2011/0279842 A1 * | 11/2011 | Abe et al. | 358/1.13 |

FOREIGN PATENT DOCUMENTS

JP    2010-062775 A    3/2010

* cited by examiner

*Primary Examiner* — Satwant Singh
(74) *Attorney, Agent, or Firm* — Maschoff Brennan

(57) ABSTRACT

A facsimile apparatus includes a common setting which specifies whether a report regarding facsimile transmission is to be outputted, or not, and a specific setting which specifies whether an output of the report regarding facsimile transmission is to be permitted, or not, for each of at least one destination of the facsimile transmission. Further, the facsimile apparatus determines whether the report related to a facsimile transmission to at least one destination is to be outputted, or not, by applying the specific setting corresponding to the at least one destination in preference to the common setting. Further, if it is determined that the report related to the facsimile transmission to the at least one destination is to be outputted, the facsimile apparatus outputs the report including information related to the facsimile transmission to the at least one destination.

12 Claims, 8 Drawing Sheets

| COMMUNICATION NO. 141 | DESTINATION NAME 142 | DESTINATION NUMBER 143 | COMMUNICATION TYPE 144 | START DATE & TIME 145 | COMMUNICATION DURATION TIME 146 | THE NUMBER OF TRANSMITTED SHEETS 147 | THE NUMBER OF RECEIVED SHEETS 148 | COMMUNICATION RESULT 149 |
|---|---|---|---|---|---|---|---|---|
| 1 | A COMPANY | 012-345-6789 | TRANSMISSION | 2011.1.1 11:11 | 0:55 | 15 | – | OK |
| 2 | B COMPANY | 023-456-7890 | TRANSMISSION | 2011.1.1 11:22 | 0:33 | 11 | – | OK |
| 3 | C COMPANY | 034-567-8901 | MULTI-ADDRESS TRANSMISSION | 2011.1.1 11:33 | 0:15 | 6 | – | OK |
| 4 | D COMPANY | 045-678-9012 | MULTI-ADDRESS TRANSMISSION | 2011.1.1 11:33 | 0:15 | 6 | – | OK |
| 5 | E COMPANY | 056-789-0123 | MULTI-ADDRESS TRANSMISSION | 2011.1.1 11:34 | 0:15 | 6 | – | OK |
| ... | ... | ... | ... | ... | ... | ... | ... | ... |

| ~151 | ~152 |
|---|---|
| REPORT TYPE | OUTPUT SETTING |
| TRANSMISSION REPORT | ON (ON/OFF/AT OCCURRENCE OF ERROR) |
| MULTI-ADDRESS TRANSMISSION REPORT | ON (ON/OFF/AT OCCURRENCE OF ERROR) |
| COMMUNICATION MANAGEMENT REPORT | ON (ON/OFF) |

| ~161 | ~162 | ~163 | ~164 |
|---|---|---|---|
| DESTINATION NAME | DESTINATION NUMBER | TRANSMISSION REPORT SETTING | MULTI-ADDRESS TRANSMISSION REPORT SETTING |
| A COMPANY | 012-345-6789 | PERMIT | PERMIT |
| B COMPANY | 023-456-7890 | PROHIBIT | PROHIBIT |
| C COMPANY | 034-567-8901 | PERMIT | PERMIT |
| D COMPANY | 045-678-9012 | PROHIBIT | PROHIBIT |
| E COMPANY | 056-789-0123 | SAME AS COMMON SETTING | SAME AS COMMON SETTING |
| ⋮ | ⋮ | ⋮ | ⋮ |

FIG. 8

| MULTI-ADDRESS TRANSMISSION REPORT | | | DATE & TIME: 2011.1.1 11:35<br>THIS STATION NAME: X COMPANY<br>THIS STATION NUMBER: 567-890-1234 | | |
|---|---|---|---|---|---|
| START DATE & TIME | DESTINATION NAME | DESTINATION NUMBER | COMMUNICATION DURATION TIME | THE NUMBER OF SHEETS | COMMUNICATION RESULT |
| 2011.1.1 11:33 | C COMPANY | 034-567-8901 | 0:15 | 6 | OK |
| 11:33 | D COMPANY | 045-678-9012 | 0:15 | 6 | OK |
| 11:34 | E COMPANY | 056-789-0123 | 0:15 | 6 | OK |

FIG. 9

| | | | | | |
|---|---|---|---|---|---|
| MULTI-ADDRESS TRANSMISSION REPORT | | | DATE & TIME: 2011.1.1  11:35<br>THIS STATION NAME: X COMPANY<br>THIS STATION NUMBER: 567-890-1234 | | |
| START DATE & TIME | DESTINATION NAME | DESTINATION NUMBER | COMMUNICATION DURATION TIME | THE NUMBER OF SHEETS | COMMUNICATION RESULT |
| 2011.1.1 11:33 | C COMPANY | 034-567-8901 | 0:15 | 6 | OK |
| 11:34 | E COMPANY | 056-789-0123 | 0:15 | 6 | OK |

FACSIMILE APPARATUS

BACKGROUND

1. Technical Field

The present invention relates to a facsimile apparatus.

2. Related Art

For facsimile apparatuses, including multi-function devises and the like each having a facsimile function in addition to a plurality of functions such as a printer function, a scanner function and a copier function, a function of printing various reports is well known.

Well-known examples of such various reports include a transmission report, on which, when a facsimile has been transmitted to one address, the result of the facsimile transmission is outputted, a multi-address transmission report, on which, when a facsimile having the same content data has been transmitted to a plurality of addresses (i.e., in the case of a facsimile multi-address transmission), the result of the multi-address transmission is outputted, a communication management report, on which the results of transmitted and received facsimiles are outputted all together at intervals of a prescribed period of time, and the like.

Further, for the purpose of coping with a risk of information leaks to a third party due to names and/or facsimile numbers of destinations included in communication management reports, there have been disclosed a technology for causing any pieces of destination information not to be printed, and a technology for causing a facsimile apparatus not to output any pieces of destination information other than pieces of destination information which are caused to correspond to individual users who are allowed to use the facsimile apparatus (for example, refer to JP-A-2010-62775).

However, in JP-A-2010-62775, any technology for coping with the risk of information leaks regarding the transmission report and the multi-address transmission report is not disclosed. Further, the communication management report has also a disadvantage in that there is a case where any pieces of destination information are not printed, and this case leads to insufficient convenience of the communication management report.

SUMMARY

An advantage of some aspects of the invention is to enhance the information security and the convenience of various reports outputted by a facsimile apparatus.

According to an aspect of the invention, a facsimile apparatus, which outputs a report regarding facsimile transmission, includes a storage section configured to store therein a common setting which specifies whether a report regarding facsimile transmission is to be outputted, or not, and a specific setting which specifies whether an output of the report regarding facsimile transmission is to be permitted, or not, for each of at least one destination of the facsimile transmission; a determination section configured to determine whether the report related to a facsimile transmission to at least one destination is to be outputted, or not, by applying the specific setting corresponding to the at least one destination in preference to the common setting; and an output section configured to, if it is determined that the report related to the facsimile transmission to the at least one destination is to be outputted, output the report including information related to the facsimile transmission to the at least one destination.

Here, in the aspect, if it is determined that the report related to the facsimile transmission to the at least one destination is not to be outputted, the output section may not output the report including information related to the facsimile transmission to the at least one destination, or the output section may output the report not including at least part of information related to the facsimile transmission to the at least one destination.

Further, if the common setting is set so as to allow the report to be outputted, and further, the specific setting corresponding to the at least one destination is set so as not to permit an output of the report, the determination section may determine that the report related to the facsimile transmission to the at least one destination is not to be outputted.

Further, the facsimile apparatus may further include a setting section configured to receive a setting change of the common setting and a setting change of the specific setting.

Further, in the case where the report is a transmission report which is outputted when a facsimile transmission to one destination has been performed, if it is determined that the report related to the facsimile transmission to the one destination is not to be outputted, the output section may not output the report including information related to the facsimile transmission to the one destination.

Further, in the case where the report is a multi-address transmission report which is outputted when a facsimile multi-address transmission to a plurality of destinations has been performed, if it is determined that the report related to the facsimile multi-address transmission to any of the plural of destinations is not to be outputted, the output section outputs the report not including at least part of information related to the facsimile multi-address transmission to the any of the plurality of destinations.

Further, in the case where the report is a communication management report including information related to a facsimile transmission to at least one destination, if it is determined that the report related to the facsimile transmission to the at least one destination is not to be outputted, the output section may output the report not including at least part of information related to the facsimile transmission to the at least one destination.

Further, the facsimile apparatus may further include a display section configured to prompt a user to confirm whether an output of the report is to be permitted, or not, by displaying the specific setting corresponding to the at least one destination of the facsimile transmission.

Further, if a telephone number of an inputted destination is already registered, and further, there is a prescribed relation between the common setting and the specific setting corresponding to the inputted destination, the display section may display the specific setting corresponding to the destination.

Further, if an abbreviated number is inputted as a destination, and further, there is a prescribed relation between the common setting and the specific setting regarding the destination corresponding to the abbreviated number, the display section may display the specific setting regarding the destination.

Further, the facsimile apparatus may further include a storage section configured to store therein a communication history related to at least one facsimile transmission; and a communication history display section configured to, on the basis of the specific setting corresponding to a destination of each of the at least one facsimile transmission, display a communication history related to any of the at least one facsimile transmission, which corresponds to a destination for which the specific setting is set so as to permit an output of the report.

BRIEF DESCRIPTION OF THE DRAWINGS

The invention will be described with reference to the accompanying drawings, wherein like numbers reference like elements.

FIG. 3 is a diagram illustrating a configuration of a communication history according to an example of an embodiment of the invention.

FIG. 4 is a diagram illustrating a configuration of a report common setting according to an example of an embodiment of the invention.

FIG. 5 is a diagram illustrating a configuration of a destination setting according to an example of an embodiment of the invention.

FIG. 8 is a diagram illustrating a multi-address transmission report according to an example of an embodiment of the invention.

FIG. 9 is a diagram illustrating a multi-address transmission report, which includes prohibited destinations, according to an example of an embodiment of the invention.

DESCRIPTION OF EXEMPLARY EMBODIMENTS

Hereinafter, an example of an embodiment of the invention will be described with reference to the drawings.

In an example of this embodiment, a facsimile apparatus according to the invention is a multi-function apparatus which is provided with a plurality of functions as a scanner, a printer, a copier and the like, and which is also called, for example, a multi-function printer (MFP). Naturally, the facsimile apparatus may be just a facsimile apparatus not including the plurality of functions.

Hereinafter, a configuration of a report outputting process regarding facsimile transmission will be mainly described.

Figure 1:
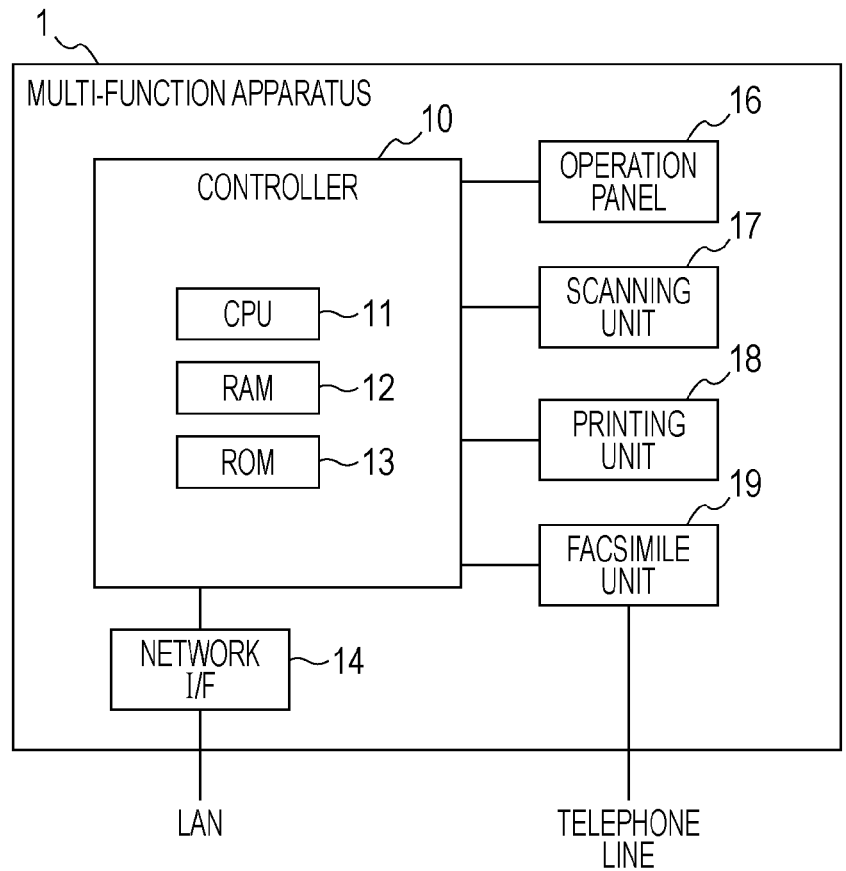
FIG. 1 is a block diagram illustrating an outline of a hardware configuration of a multi-function apparatus according to an example of an embodiment of the invention.

Referring to FIG. 1 which is a block diagram illustrating an outline of a hardware configuration of a multi-function apparatus according to an example of this embodiment, a multi-function apparatus 1 is connected to a network, such as a local area network (LAN), and further, is connected to a telephone line. Upon reception of a print instruction from an information processing apparatus, such as a personal computer (PC), which is connected to the multi-function apparatus 1 via the LAN, the multi-function apparatus 1 executes printing. Further, upon reception of a user's operation from an operation panel 16, the multi-function apparatus 1 executes copying, scanning, or a facsimile transmission. Further, the multi-function apparatus 1 receives a facsimile from a sender via the telephone line. Further, the multi-function apparatus 1 executes printing of individual types of reports (i.e., a transmission report, a multi-address transmission report and a communication management report).

The multi-function apparatus 1 includes a controller 10, a network I/F 14, the operation panel 16, a scanning unit 17, a printing unit 18, and a facsimile unit 19.

The controller 10 is a unit for performing integrated control of the multi-function apparatus 1, and includes a central processing unit (CPU) 11, random access memory (RAM) 12, and read only memory (ROM) 13. The controller 10 may include an image processing circuit for executing various image processes.

For example, upon reception of print data from a host apparatus, such as a PC, via the network interface (I/F) 14, the controller 10 creates data, which can be interpreted by the printing unit 18, on the basis of the print data, and causes the printing unit 18 to execute printing based on the created data onto a printing medium.

Further, for example, upon reception of an instruction, via the operation panel 16, for transmitting a facsimile, the controller 10 causes the scanning unit 17 to read in the content of a document targeted for the facsimile transmission. Further, the controller 10 establishes a call with a destination having been specified via the operation panel 16, and instructs the facsimile unit 19 to transmit image data having been read in by the scanning unit 17.

Further, for example, upon reception of a facsimile via the facsimile unit 19, the controller 10 creates data, which can be interpreted by the printing unit 18, on the basis of the received data, and causes the printing unit 18 to execute printing based on the created data onto a printing medium.

Further, the controller 10 performs management of communication histories of facsimiles, outputs of the individual types of reports, settings for the individual types of reports, and the like. Details of these operations will be hereinafter described.

The network I/F 14 is a unit for performing control of communication with a network, such as a LAN.

The operation panel 16 is a unit for displaying information for users, and receiving operations from users. The operation unit 16 includes, for example, a liquid crystal display, a touch panel, various hardware switches and the like.

The scanning unit 17 is a unit for reading in the content of a document, which is set on a document table, in accordance with an instruction from the controller 10. The read-in image data is outputted to the controller 10, and is processed by the controller 10. The scanning unit 17 is a mechanism including, for example, an image sensor, a light source lamp, a carriage, and the like.

The printing unit 18 is a unit for executing printing based on data outputted from the controller 10 on the basis of an instruction from the controller 10. The printing unit 18 is a mechanism employing, for example, a laser method or an ink jet method.

The facsimile unit 19 is a unit for performing control of facsimile communication. The facsimile unit 19 connects to, for example, a telephone line, performs control of initiating calls and receiving calls through the telephone line, and encoding and decoding of communication data, and transmits and receives image data and the like to/from a facsimile apparatus or the like installed at a destination (i.e., an opposite party of facsimile communication).

Naturally, the hardware configuration of the multi-function apparatus 1 according to the example of this embodiment is not limited to the above-described hardware configuration, which is just a main configuration in description of the characteristics of the invention. Further, the hardware configuration of the multi-function apparatus 1 does not remove any configuration included in common multi-function apparatuses. For example, the hardware configuration of the multi-function apparatus 1 may include an interface for a card type storage medium and/or a USB interface for writing and reading data to/from a portable storage medium including flash ROM or the like.

Figure 2:
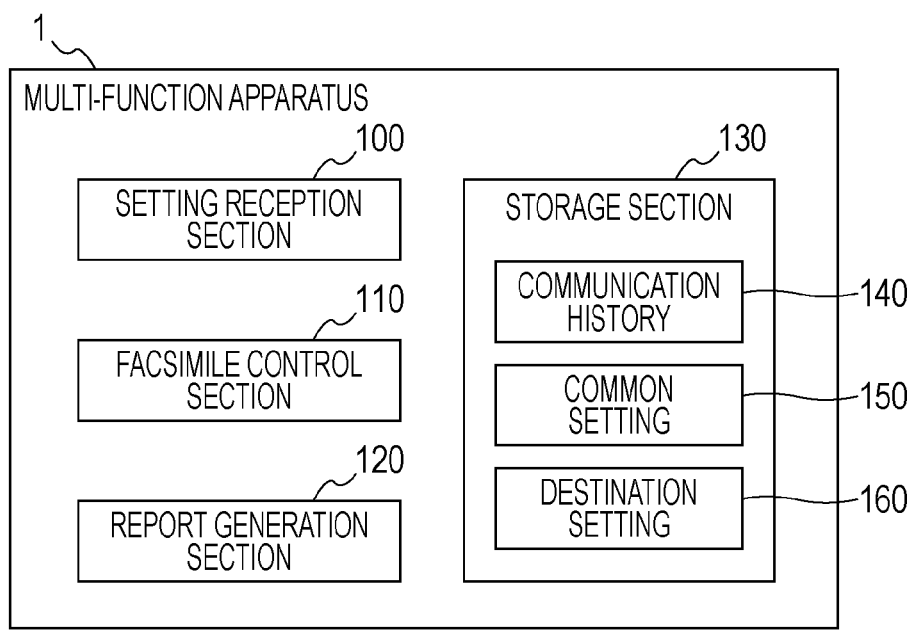
FIG. 2 is a block diagram illustrating a configuration of functions of a multi-function apparatus according to an example of an embodiment of the invention.

Referring to FIG. 2 which is a block diagram illustrating a configuration of functions of a multi-function apparatus according to an example of an embodiment of the invention, the multi-function apparatus 1 includes a setting reception section 100, a facsimile control section 110, a report generation section 120 and a storage section 130.

The individual function sections described above are realized by, for example, causing the CPU 11 to execute a prescribed program having been loaded to the RAM 12 from the ROM 13. This prescribed program is installed and/or updated by being downloaded on line via, for example, the network I/F 14. Further, in the case where the multi-function apparatus 1 is provided with an interface with a storage medium, the prescribed program may be installed and/or updated by being read out from a portable storage medium including flash ROM or the like.

The setting reception section 100 is a function section for receiving users' instructions regarding operations of the multi-function apparatus 1.

The setting reception section 100 displays, on the operation panel 16, a user interface screen for receiving individual settings, such as a setting for selecting a destination of a facsimile transmission (i.e., a selection from among destinations having been registered in advance), and a setting for issuing an instruction for starting a facsimile transmission. The setting reception section 100 displays a list of destination names and pieces of destination information on, for example, the user interface screen on the basis of a destination setting 160 described below. Further, the setting reception section 100 receives, via the operation panel 16, operations having been performed on the user interface screen, and through the operations, receives a selection of a destination of a facsimile transmission, an instruction for starting a facsimile transmission, and the like.

Further, the setting reception section 100 displays, on the operation panel 16, an user interface screen for receiving destinations, and settings for the individual types of reports (i.e., the transmission report, the multi-address transmission report and the communication management report). Further, the setting reception section 100 receives, via the operation panel 16, operations having been performed on the user interface screen, and through the operations, receives the destinations, and the settings regarding the different types of reports.

In this embodiment, the settings regarding the different types of reports include a common setting, which is applied in common with all of destinations, and a specific setting (included in a destination setting), which is set for each of destinations. As described hereinafter, the specific setting is applied in preference to the common setting. The common setting and the specific setting will be described in detail with reference to FIGS. 4 and 5.

FIG. 4 is a diagram illustrating a configuration of a report common setting according to an example of an embodiment of the invention.

A common setting 150 includes a record for each of the different types of records, the record corresponding to a content of a report type 151 and a setting content of an output setting 152 therefor. The report type 151 includes three kinds of contents, which are "TRANSMISSION REPORT", "MULTI-ADDRESS TRANSMISSION REPORT" and "COMMUNICATION MANAGEMENT REPORT". A setting content of the output setting 152, which corresponds to each of the transmission report and the multi-address transmission report, is any one of "ON" for setting the output of a corresponding report to ON; "OFF" for setting the output of a corresponding report to OFF; and "AT OCCURRENCE OF ERROR" for causing a corresponding report to be outputted when a certain error, such as a communication error, has occurred. A setting content of the output setting 152, which corresponds to the communication management report, is any one of "ON" and "OFF".

FIG. 5 is a diagram illustrating a configuration of a destination setting according to an example of an embodiment of the invention.

The destination setting 160 includes a record for each of destinations, the record corresponding to setting contents of a destination name 161, a destination number 162, a transmission report setting 163, and a multi-address transmission setting 164. A setting content of each of the transmission report setting 163 and the multi-address transmission report setting 164 regarding a certain destination is any one of "PERMIT" for permitting the output of a corresponding report related to the destination; "PROHIBIT" for prohibiting the output of a corresponding report related to the destination; and "SAME AS COMMON SETTING" for causing the output of a corresponding report related to the destination to be performed in accordance with an output setting of the common setting 150, which corresponds to the corresponding report. In addition, a communication management report setting regarding a certain destination is to be in accordance with a setting content of the transmission report setting 163 regarding the destination. Moreover, in the case where a common setting corresponding to the transmission report (the multi-address transmission report) is "OFF", regardless of a transmission report setting (a multi-address transmission report setting), the output of the transmission report (the multi-address transmission report) is not performed.

Naturally, configurations of individual pieces of setting information are not limited to those shown in FIGS. 4 and 5, which are just examples.

When receiving a setting change for any of common settings, for example, the setting reception section 100 displays a list of the common settings on a prescribed user interface screen, and allows a user to, for each of the report types 151, select any one of items targeted for selection regarding the output setting 152. Further, when receiving a setting for any of specific settings, for example, the setting reception section 100 displays a list of destination settings including the specific settings on a prescribed user interface, and allows a user to, for a certain destination having been selected by the user, select any one of items targeted for selection regarding each of the transmission report setting 163 and the multi-address transmission setting 164. Moreover, upon reception of an operation of addition, deletion, modification or the like of a certain record of the destination setting 160 via a prescribed user interface screen, the setting reception section 100 executes addition, deletion, or modification of the record of the destination setting 160 in accordance with the content of the operation.

The facsimile control section 110 is a function section for performing control of facsimile transmission and reception.

When the setting reception section 100 has received an instruction for starting a facsimile transmission, the facsimile control section 110 causes the scanning unit 17 to read in the content of a document targeted for the facsimile transmission. Further, the facsimile control section 110 instructs the facsimile unit 19 to establish a call connection with a destination having been received via the setting reception section 100 (i.e., a destination having been selected by a user). Moreover, the facsimile control section 110 instructs the facsimile unit 19 to transmit image data, which has been read in by the scanning unit 17, to the destination. In the case of a multi-address transmission, the facsimile control section 110 instructs the facsimile unit 19 to sequentially establish a call connection with each of a plurality of destinations having been received via the setting reception section 100 to execute a facsimile data transmission thereto.

Further, when having received a facsimile via the facsimile unit 19, the facsimile control section 110 creates data which can be interpreted by the printing unit 18, and causes the printing unit 18 to execute printing based on the created data onto a printing medium.

Moreover, every time a facsimile transmission or a facsimile reception is executed, the facsimile control section 110 records a communication history thereof.

FIG. 3 is a diagram illustrating a configuration of a communication history according to an example of an embodiment of the invention.

A communication history 140 includes a record for each of communications, the record corresponding to contents of a communication number 141, which uniquely identifies each of communications; a destination name 142, which indicates a name of a destination in the case where a corresponding communication is a facsimile transmission, or a name of a transmission source in the case where a corresponding communication is a facsimile reception; a destination number 143, which indicates a telephone number of a destination in the case where a corresponding communication is a facsimile transmission, or a telephone number of a transmission source in the case where a corresponding communication is a facsimile reception; a communication type 144, which indicates a type of communication, such as a transmission, a multi-address transmission or a reception; a start date and time 145 regarding each of communications; a communication duration time 146, which indicates a duration time of each of communications; the number of transmitted sheets 147; the number of received sheets 148; and a communication result 149, which indicates a successful completion, an occurrence of error or the like regarding each of communications.

When having executed a facsimile transmission to one destination, the facsimile control section 110 adds a record corresponding to the destination to those of the communication history 140, and sets individual pieces of information into contents of the record. When having executed a multi-address transmission to a plurality of destinations, the facsimile control section 110 adds a record corresponding to each of the destinations to those of the communication history 140, and sets various pieces of information into contents of the record. In the case where a facsimile transmission to one destination has been performed, the facsimile control section 110 sets "TRANSMISSION" into a setting content of the communication type 144, which is included in the added record. In the case where a multi-address transmission has been performed, the facsimile control section 110 sets "MULTI-ADDRESS TRANSMISSION" into setting contents of the communication type 144, which are included in the respective added records. When having received a facsimile, the facsimile control section 110 adds a record corresponding to a destination (i.e., a transmission source) thereof to those of the communication history 140, and sets various pieces of information into contents of the record. In this case, the facsimile control section 110 sets "RECEPTION" into a setting content of the communication type 144, which is included in the added record.

The report generation section 120 is a function section for performing control of outputs of the individual types of reports.

When a facsimile transmission to one destination has been executed by the facsimile control section 110, the report generation section 120 specifies a record corresponding to the destination from the communication history 140. Further, the report generation section 120 acquires a setting content of the output setting 152, which corresponds to the transmission report, from the common setting 150. Further, the report generation section 120 acquires a setting content of the transmission report setting 163, which corresponds to the destination, from the destination setting 160. Moreover, on the basis of these setting contents, the report generation section 120 determines whether a transmission report related to the facsimile transmission to the one destination is to be printed, or not. When printing the transmission report, the report generation section 120 acquires at least part of information included in the record corresponding to the destination from the communication history 140 to create print data, and causes the printing unit 18 to execute printing based on the created print data onto a printing medium.

Further, when a facsimile multi-address transmission to a plurality of destinations has been executed by the facsimile control section 110, the report generation section 120 specifies records corresponding to the respective plurality of destinations from the communication history 140. Further, the report generation section 120 acquires a setting content of the output setting 152, which corresponds to the multi-address transmission report, from the common setting 150. Further, the report generation section 120 acquires a setting content of the multi-address transmission report setting 164, which corresponds to each of the plurality of destinations, from the destination setting 160. Moreover, on the basis of these setting contents, the report generation section 120 determines whether pieces of information related to the respective destinations are to be printed on a multi-address transmission report, or not. When printing the multi-address transmission report, the report generation section 120 specifies destinations other than those each having a setting content of the multi-address transmission report setting 164, which is set to "PROHIBIT", acquires at least part of information included in each of records corresponding to the respective specified destinations from the communication history 140 to create print data, and causes the printing unit 18 to execute printing based on the created print data onto a printing medium.

Further, the report generation section 120 determines prescribed conditions, such as a condition as to whether a prescribed period of time has elapsed since an immediately previous printing of a communication management report, or not, and a condition as to whether the number of communications has exceeded a prescribed number, or not. If the prescribed conditions are satisfied, the report generation section 120 specifies records corresponding to respective one or more destinations (for example, destinations regarding respective one or more facsimile communications which have been executed since an immediately previous printing of a communication management report) from the communication history 140. Further, the report generation section 120 acquires a setting content of the output setting 152, which corresponds to the communication management report, from the common setting 150. Further, the report generation section 120 acquires setting contents of the transmission report setting 163, which correspond to the respective one or more destinations. Moreover, on the basis of these setting contents, the report generation section 120 determines whether a communication management report is to be printed, or not. When printing the communication management report, the report generation section 120 specifies destinations other than those each having a setting content of the transmission report setting 163, which is set to "PROHIBIT", acquires at least part of information included in each of records corresponding to the respective specified destinations to create print data, and causes the printing unit 18 to execute printing based on the created print data onto a printing medium.

The storage section 130 is a function section for storing therein the communication history 140, the common setting 150 and the destination setting 160.

The above-described configuration elements are ones resulting from classification of a process configuration of the multi-function apparatus 1 in accordance with key process contents thereof for the purpose of making it easy to understand the process configuration thereof. In addition, the scope of the invention is not limited by any way of the classification into configuration elements, and any names of the configuration elements. The process configuration of the multi-function apparatus 1 can be classified into a larger number of configuration elements in accordance with smaller key process contents thereof. Moreover, the process configuration of the multi-function apparatus 1 can be classified such that each of the configuration elements can execute a larger number of processes. Furthermore, processes of each configuration element may be executed by just a hardware element, or may be executed by a plurality of hardware elements. For example, at least part of functions of each of the function sections may be realized by any of other units, such as the facsimile unit 19, or may be realized by cooperation of the controller 10 and any of other units, such as the facsimile unit 19.

Next, a report outputting process, which is a characteristic process realized by the above-described multi-function apparatus 1, will be described.

Figure 6:
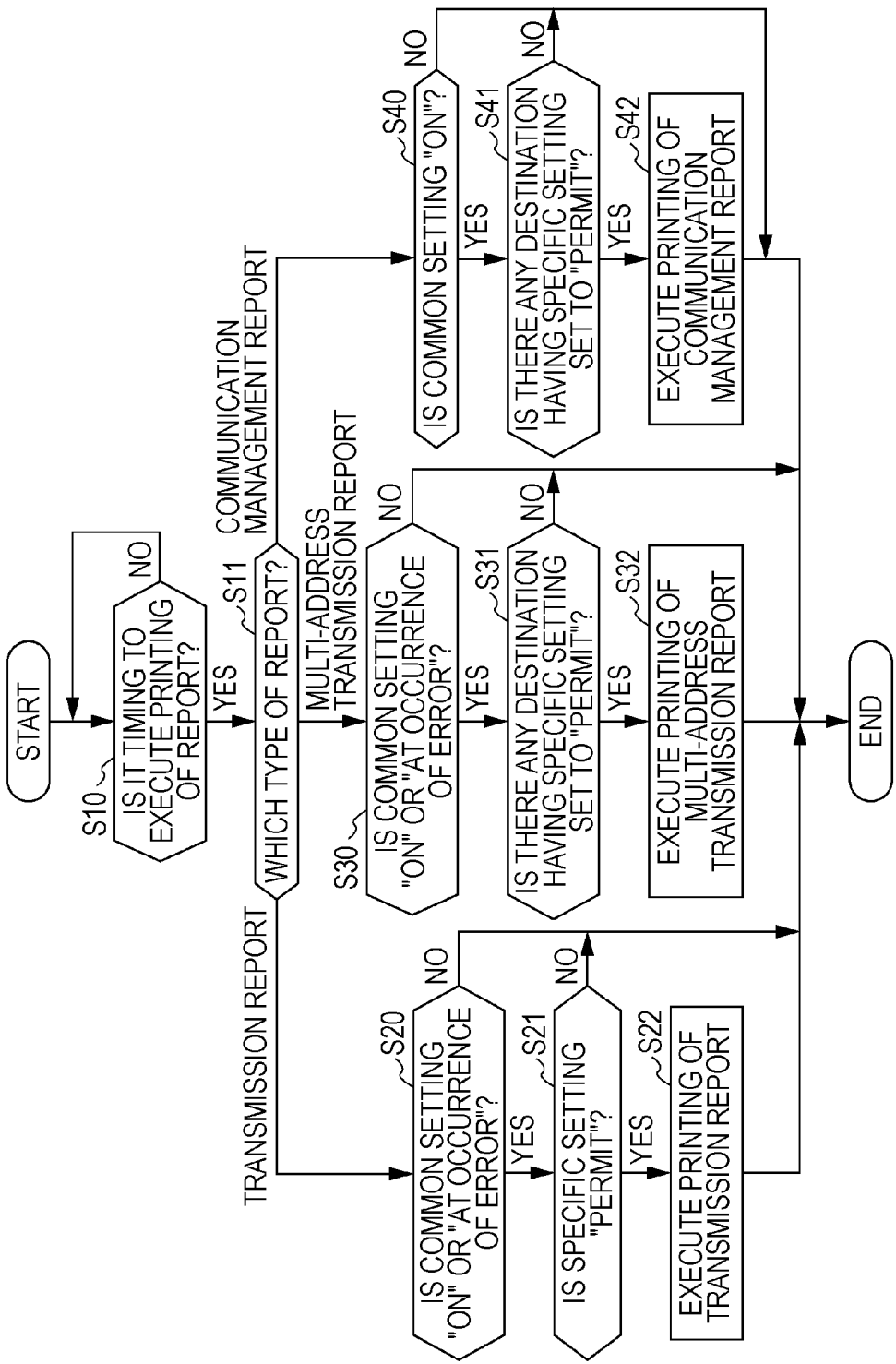
FIG. 6 is a flowchart illustrating a report outputting process according to an example of an embodiment of the invention.

FIG. 6 is a flowchart illustrating a report outputting process according to an example of an embodiment of the invention. Processes included in this flowchart are executed when the multi-function apparatus 1 is in an operation mode. Further, in this flowchart, it is assumed that a facsimile transmission or a multi-address transmission is executed regarding at least one destination selected from among destinations registered in the destination setting.

In S10, the report generation section 120 determines whether a current timing is appropriate to an execution of printing of a relevant type of report, or not. Specifically, the report generation section 120 determines whether a facsimile transmission to one destination has been executed, or not; whether a facsimile multi-address transmission to a plurality of destinations has been executed, or not; or whether a prescribed condition, such as a condition in which a prescribed period of time has elapsed since an immediately previous printing of a communication management report, has been satisfied, or not. If a facsimile transmission to one destination has been executed; a facsimile multi-address transmission to a plurality of destinations has been executed; or a prescribed condition has been satisfied (S10: YES), the report generation section 120 determines that a current timing is appropriate to an execution of printing of a relevant type of report, and causes the process flow to proceed to step S11. Otherwise (S10: NO), the report generation section 120 continues the determination process.

In S11, the report generation section 120 determines a type of report to be printed. Specifically, if it has been determined in S10 that a facsimile transmission to one destination has been executed, the report generation section 120 determines that a type of report to be printed is a transmission report (S11: TRANSMISSION REPORT), and causes the process flow to proceed to S20. If it has been determined in S10 that a multi-address transmission to a plurality of destinations has been executed, the report generation section 120 determines that a type of report to be printed is a multi-address transmission report (S11: MULTI-ADDRESS TRANSMISSION REPORT), and causes the process flow to proceed to S30. If it has been determined in S10 that a prescribed condition has been satisfied, the report generation section 120 determines that a type of report to be printed is a communication management report (S11: COMMUNICATION MANAGEMENT REPORT), and causes the process flow to proceed to S40.

In S20, the report generation section 120 determines whether a common setting is any one of "ON" and "AT OCCURRENCE OF ERROR", or not. Specifically, the report generation section 120 acquires a setting content of the output setting 152, which corresponds to the transmission report, from the common setting 150. If the setting content of the output setting 152 is "ON" (S20: YES), the report generation section 120 causes the process flow to proceed to S21. If the setting content of the output setting 152 is "AT OCCURRENCE OF ERROR", the report generation section 120 specifies a record corresponding to a destination, to which a relevant facsimile has been transmitted, from the communication history 140, and determines whether a piece of information notifying that a certain error has occurred is set in a setting content of the communication result 149, which is included in the specified record, or not. If the setting content of the output setting 152 is "AT OCCURRENCE OF ERROR", and further, a certain error has occurred (S20: YES), the report generation section 120 causes the process flow to proceed to S21. Otherwise (that is, if the setting content of the output setting 152 is "OFF", or if the setting content of the output setting 152 is "AT OCCURRENCE OF ERROR" and further any errors have not occurred), the report generation section 120 does not execute printing of the transmission report, and terminates the process flow.

In S21, the report generation section 120 determines whether a specific setting is "PERMIT", or not. Specifically, the report generation section 120 specifies a record corresponding to a destination, to which the relevant facsimile has been transmitted, from the destination setting 160, and acquires a setting content of the transmission report setting 163, which is included in the specified record. If the setting content of the transmission report setting 163 is "PERMIT" or "SAME AS COMMON SETTING" (S21: YES), the report generation section 120 causes the process flow to proceed to S22. If the setting content of the transmission report setting 163 is "PROHIBIT" (S21: NO), the report generation section 120 does not execute printing of the transmission report, and terminates the process flow.

In S22, the report generation section 120 executes printing of the transmission report. Specifically, the report generation section 120 acquires at least part of information from a communication history record corresponding to a destination, to which the relevant facsimile has been transmitted, to create print data, and causes the printing unit 18 to execute printing based on the created print data. In addition, the report generation section 120 may create print data including at least part of image data having been transmitted.

Figure 7:
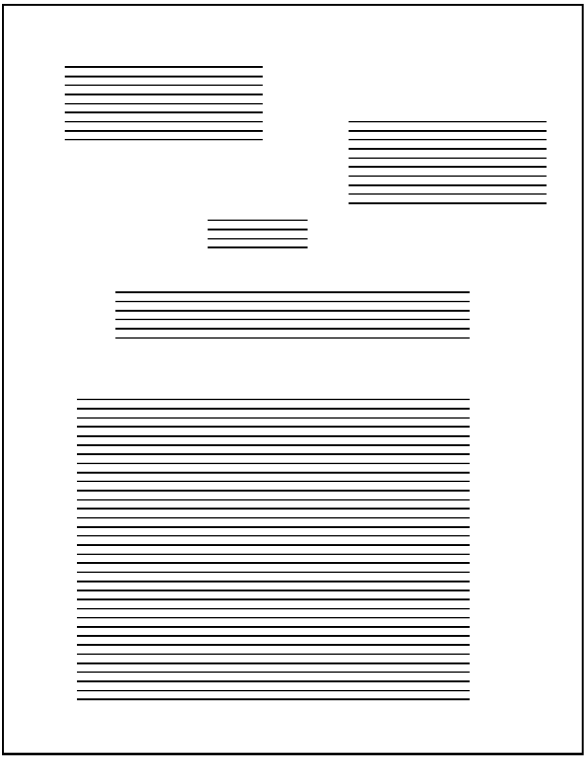
FIG. 7 is a diagram illustrating a transmission report according to an example of an embodiment of the invention.

The transmission report can be configured, such as shown in FIG. 7. As shown in FIG. 7, the transmission report includes pieces of information printed thereon, which are a start date and time, a destination name, a destination number, a communication duration time, the number of sheets and a communication result. These pieces of information are ones based on part of pieces of information included in a communication history record. Moreover, at least one page of transmitted image data is reduction printed as the content of transmitted document.

In addition, even if it has been determined that the transmission report is not to be printed, processing may be executed such that the transmission report including part of pieces of information, which is of a degree that does not result in specification of a corresponding destination, such as a start date and time, a communication duration time, the number of sheets and a communication result, is printed.

In S30, the report generation section 120 determines whether a common setting is any one of "ON" and "AT OCCURRENCE OF ERROR", or not. Specifically, the report generation section 120 acquires a setting content of the output setting 152, which corresponds to the multi-address transmission report, from the common setting 150. If the setting content of the output setting 152 is "ON" (S30: YES), the report generation section 120 causes the process flow to proceed to S31. If the setting content of the output setting 152 is "AT OCCURRENCE OF ERROR", the report generation section 120 specifies records, which correspond to a respective plurality of destinations of a relevant facsimile multi-address transmission, from the communication history 140, and determines whether, among the specified records, there exists any record including a setting content of the communication result 149, in which a piece of information indicating the occurrence of a certain error is set, or not. If the setting content of the output setting 152 is "AT OCCURRENCE OF ERROR", and further, there exists any record including a piece of information indicating the occurrence of a certain error (S30: YES), the report generation section 120 causes the process flow to proceed to S31. Otherwise (that is, if the setting content of the output setting 152 is "OFF", or if the setting content of the output setting 152 is "AT OCCURRENCE OF ERROR" and further there do not exist any records each including a piece of information indicating the occurrence of a certain error), the report generation section 120 does not execute printing of the multi-address transmission report, and terminates the process flow.

In S31, the report generation section 120 determines whether there exists any destination having a specific setting which is set to "PERMIT", or not. Specifically, the report generation section 120 specifies records corresponding to respective destinations, for which the relevant facsimile multi-address transmission has been executed, from the destination setting 160, and acquires setting contents of the multi-address transmission report setting 164, which are included in the respective specified records. If there exists any record having a multi-address transmission setting which is set to "PERMIT" or "SAME AS COMMON SETTING" (S31: YES), the report generation section 120 causes the process flow to proceed to S32. If there do not exist any records each having a multi-address transmission setting which is set to "PERMIT" or "SAME AS COMMON SETTING", that is, if all the records have multi-address transmission settings each being set to "PROHIBIT" (S31: NO), the report generation section 120 does not execute printing of the multi-address transmission report, and terminates the process flow. In addition, if an output setting is set to "AT OCCURRENCE OF ERROR", and further, multi-address transmission report settings corresponding to respective destinations, for each of which a certain error has occurred, are set to "PROHIBIT", the report generation section 120 may do not execute printing of the multi-address transmission report, and may terminate the process flow.

In S32, the report generation section 120 executes printing of the multi-address transmission report. Specifically, the report generation section 120 specifies communication history records corresponding to respective destinations, for each of which a setting content of the multi-address transmission report setting 164 is set to "PERMIT" or "SAME AS COMMON SETTING", among a plurality of destinations for which the relevant facsimile multi-address transmission has been executed. Further, the report generation section 120 acquires at least part of pieces of information from each of the specified communication history records to create print data, and causes the printing unit 18 to execute printing based on the created print data. In addition, the report generation section 120 may create print data including at least part of image data which has been transmitted through the multi-address transmission.

The multi-address transmission report can be configured, such as shown in FIG. 8, if none of destinations, for which the multi-address transmission has been executed, is set to "PROHIBIT". As shown in FIG. 8, the multi-address transmission report includes pieces of information printed thereon for each of the destinations, which are a start date and time, a destination name, a destination number, a communication duration time, the number of sheets and a communication result. Meanwhile, the multi-address transmission report can be configured, such as shown in FIG. 9, if part of destinations, for which the multi-address transmission has been executed, is set to "PROHIBIT". That is, pieces of information corresponding to respective destinations each being set to "PROHIBIT" (for example, "D COMPANY" of FIG. 9) are not printed. Naturally, in order to make rows corresponding to respective destinations each being set to "PROHIBIT" invisible, a distance between two rows, which are located immediately above and below each of the lines, may be narrowed. In addition, part of pieces of information, which is of a degree that does not result in specification of any of destinations each being set to "PROHIBIT", such as a start day and time, a communication duration time, the number of sheets and a communication result, may be printed.

In S40, the report generation section 120 determines whether a common setting is "ON", or not. Specifically, the report generation section 20 acquires a setting content of the output setting 152, which corresponds to the communication management report, from the common setting 150. If the setting content of the output setting 152 is "ON" (S40: YES), the report generation section 120 causes the process flow to proceed to S41. If the setting content of the output setting 152 is "OFF", the report generation section 120 does not execute printing of the communication management repot, and terminates the process flow.

In S41, the report generation section 120 determines whether there exists any destination having a specific setting which is set to "PERMIT", or not. Specifically, the report generation section 120 specifies records from the destination setting 160, which correspond to respective destinations included one or more facsimile communications targeted for printing of the communication management report (the one or more facsimile communications being, for example, ones having been made since an immediately previous printing of the communication management report), and acquires setting contents of the transmission report setting 163, which are included in the respective specified records. If there exists any record having a transmission report setting which is set to "PERMIT" or "SAME AS COMMON SETTING" (S41: YES), the report generation section 20 causes the process flow to proceed to S42. If there do not exist any records each having a transmission report setting which is set to "PERMIT" or "SAME AS COMMON SETTING", that is, if each of the specified records has a transmission report setting which is set to "PROHIBIT" (S41: NO), the report generation section 20 does not execute printing of the communication management report, and terminates the process flow.

In S42, the report generation section 120 executes printing of the communication management report. Specifically, the report generation section 20 specifies communication history records corresponding to respective destinations each having a setting content of the transmission report setting 163, which is set to "PERMIT" or "SAME AS COMMON SETTING", from among the one or more facsimile communications targeted for printing of the communication management report. Further, the report generation section 20 acquires at least part of pieces of information from each of the specified records to create print data, and causes the printing unit 18 to execute printing based on the created print data onto a printing medium.

If none of the destinations targeted for printing of the communication management report is set to "PROHIBIT", for example, for each of all the destinations, a start date and time, a destination number, the number of sheets and a communication result are printed on the communication management report. In contrast, if part of the destinations targeted for printing of the communication management report is set to "PROHIBIT", for example, any pieces of information related to each of the destinations which are set to "PROHIBIT" are not printed on the communication management report. In addition, for each of the destinations which are set to "PROHIBIT", part of pieces of information, which is of a degree that does not result in specification of the destination, such as a start date and time, a communication duration time, the number of sheets and a communication result, may be printed on the communication management report.

In such a way as described above, the report outputting process is controlled on the basis of the common setting and the destination setting.

In addition, individual process units included in the process flow described above are ones resulting from segmentation of processing of the multi-function apparatus 1 in accordance with key process contents thereof for the purpose of making it easy to understand the processing of the multi-function apparatus 1. The scope of the invention is not limited by any way of the segmentation into process units, and any names of the process units. The processing performed by the multi-function apparatus 1 can be segmented into a larger number of process units in accordance with smaller key process contents. Moreover, the segmentation can be performed such that each of the process units includes a larger number of processes.

Hereinbefore, an example of an embodiment according to the invention has been described. According to this embodiment, it is possible to enhance the information security and the convenience of any type of report outputted by a facsimile apparatus.

Namely, according to this embodiment, it is possible to set the output of any type of report into a permission mode or a prohibition mode for each of destinations. Further, regarding a certain destination, for which the output of any type of report is set into the prohibition mode, any reports of the any type of report themselves are not outputted, or any pieces of information related to the destination are not included in each of outputted reports of the any type of report. In such a configuration as described above, it is possible to, regarding each of specific destinations, reduce the amount of risk of information leaks caused by any type of report, and this reduction leads to an improvement of information security.

Further, to date, there has been a disadvantage in that, even though the output of any type of report related to a facsimile communication regarding any of specific destinations is not desired, any reports of the any type of report regarding all destinations are not outputted because the function of performing a report output setting specific to each destination is not provided. However, in this embodiment, the function of performing a report output setting specific to each destination is provided, thereby enabling realization of the report output setting in accordance with a user's intention, and this realization leads to high convenience. For example, the output of any type of report regarding any of specific destinations can be set to "PROHIBIT", and the output of the any type of report regarding each of destinations other than the specific destinations can be set to "PERMIT".

The above-described embodiment is intended to exemplify the gist and scope of the invention, and does not limit them. Lots of alternatives, modifications and changes are obvious for those skilled in the art.

Modified Example 1

For example, when the above-described method, in which a selection of a destination is made from among destinations having been registered in advance, is not adopted, but a method, in which a destination number of a destination of a facsimile transmission is directly received through an input using a ten-key numerical keypad or the like, is adopted, the setting reception section 100 may prompt a user to conform a transmission report output setting corresponding to the destination before starting the facsimile transmission.

Specifically, the setting reception section 100 determines whether any record corresponding to a directly inputted destination is registered in the destination setting 160, or not. In the case where it is determined that the record is registered in the destination setting 160, if a setting content of the output setting 152, which corresponds to the transmission report, is "ON" or "AT OCCURRENCE OF ERROR", and further, a setting content of the transmission report setting 163, which corresponds to the destination, is "PROHIBIT", the setting reception section 100 displays a confirmation screen, such as a confirmation screen 800 shown in FIG. 10, on the operation panel 16. If a setting content of the output setting 152, which corresponds to the transmission report, is "OFF", or if a setting content of the transmission report setting 163, which corresponds to the destination, is "PERMIT" or "SAME AS COMMON SETTING", the setting reception section 100 does not display the confirmation screen. Naturally, in this case, the setting reception section 100 may display the confirmation screen.

The confirmation screen 800 is provided thereon with indications and buttons, such as a message 810 for prompting a user to confirm whether the transmission report is to be printed, or not; a selection area 820 for prompting the user to select an execution of printing or a non-execution of printing of the transmission report ("YES" or "NO"); a facsimile transmission button 850 for receiving an instruction from the user for carrying on the facsimile transmission; and a cancellation button 860 for receiving an instruction from the user for canceling the facsimile transmission. The message 810 includes pieces of information related to a facsimile transmission to a certain destination, which are a destination name, a destination number and a current setting content of the transmission report output setting, which corresponds to the destination.

In the case where it is determined that the record is not registered in the destination setting 160, after completion of the facsimile transmission, on the basis of a setting content of the common setting 150, which corresponds to the transmission report, that is, if the setting content is "ON", or if the setting content is "AT OCCURRENCE OF ERROR" and actually a certain error has occurred, the report generation section 120 executes printing of the transmission report. Naturally, even if any records corresponding to the destination are not registered in the destination setting 160, the report generation section 120 may prompt a user to confirm an execution of printing or a non-execution of printing of the transmission report by displaying a confirmation screen.

In the case where a certain record corresponding to the destination is registered in the destination setting 160, and further, the confirmation screen is displayed, if the "YES" button of the selection area 820 has been selected, the report generation section 120 determines that the condition of "YES" in S21 of FIG. 6 is satisfied regardless of a setting content of the transmission report setting 163, which corresponds to the destination. If the "NO" button of the selection area 820 has been selected, the report generation section 120 determines that the condition of "NO" in S21 of FIG. 6 is satisfied. In the case where a certain record corresponding to the destination is registered in the destination setting 160, and further, the confirmation screen is not displayed, processing is performed in accordance with that shown in FIG. 6.

If such a method described above is adopted, even for a destination having been directly inputted, it is possible to prompt a user to confirm a transmission report output setting corresponding to the destination. Moreover, it is also possible to change a setting regarding an execution of printing or a non-execution of printing of the transmission report. In addition, a method just like that described above can be also applied to the multi-address transmission. In this case, the method can be realized merely by causing the setting reception section 100 to, for each of registered destinations, display the message 810 and the selection area 820 on the confirmation screen 800, and receive a selection of an execution of printing or a non-execution of printing of the multi-address transmission report.

Modified Example 2

For example, when having received an abbreviated destination of a facsimile transmission through an input using a ten-key numerical keypad or the like, the setting reception section 100 may prompt a user to conform a transmission report setting corresponding to a destination corresponding to the abbreviated destination before starting the facsimile transmission.

Specifically, the setting reception section 100 specifies a destination number corresponding to an inputted abbreviated destination number on the basis of a list of records each corresponding to an abbreviated destination number and a destination number which have been registered in advance. Subsequently, the setting reception section 100 specifies a record corresponding to the specified destination number from the destination setting 160. If a setting content of the output setting 152 of the common setting 150, which corresponds to the transmission report, is "ON" or "AT OCCURRENCE OF ERROR", and further, a setting content of the transmission report setting 163, which corresponds to the specified destination, is "PROHIBIT", the setting reception section 100 displays a confirmation screen, such as the confirmation screen 800 shown in FIG. 10, on the operation panel 16. If a setting content of the output setting 152 of the common setting 150, which corresponds to the transmission report, is "OFF", or if a setting content of the transmission report setting 163, which corresponds to the destination, is "PERMIT" or "SAME AS COMMON SETTING", the setting reception section 100 does not display the confirmation screen. Naturally, in this case, the setting reception section 100 may display the confirmation screen.

After completion of the transmission of a facsimile, in the case where the confirmation screen is displayed, if the "YES" button of the selection area 820 has been selected, the report generation section 120 determines that the condition of "YES" in S21 of FIG. 6 is satisfied regardless of a setting content of the transmission report setting 163, which corresponds to the destination. If the "NO" button of the selection area 820 has been selected, the report generation section 120 determines that the condition of "NO" in S21 of FIG. 6 is satisfied. In the case where the confirmation screen is not displayed, processing is performed in accordance with that shown in FIG. 6.

If such a method as described above is adopted, even for a destination having been inputted in the form of an abbreviated destination, it is possible to prompt a user to confirm a transmission report setting corresponding to the destination. Moreover, it is also possible to change a setting regarding an execution of printing or a non-execution of printing of the transmission report. In addition, a method just like that described above can be also applied to the multi-address transmission. In this case, the method can be realized merely by causing the setting reception section 100 to, for each of destinations corresponding to respective abbreviated destinations, display the message 810 and the selection area 820 on the confirmation screen 800, and receive a selection of an execution of printing or a non-execution of printing of the multi-address transmission report.

Modified Example 3

For example, when having received a selection of a destination of a facsimile transmission and an instruction for starting the facsimile transmission, the setting reception section 100 may prompt a user to confirm a transmission report setting corresponding to the selected destination.

Figure 10:
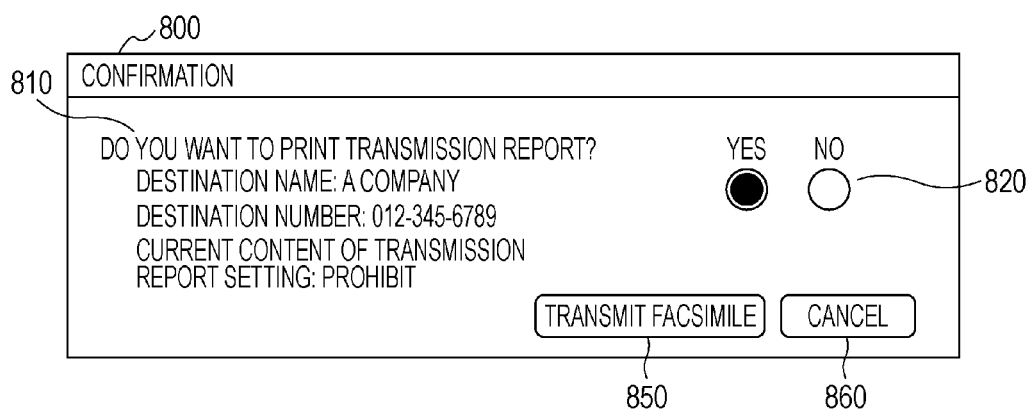
FIG. 10 is a diagram illustrating a confirmation screen according to an example of an embodiment of the invention.

Specifically, the setting reception section 100 displays a confirmation screen, such as the confirmation screen shown in FIG. 10, on the operation panel 16. When "YES" has been selected in the selection area 82, the report generation section 120 determines that the condition of "YES" in S21 of FIG. 6 has been satisfied regardless of a setting content of the transmission report setting 163, which corresponds to the destination. When "NO" has been selected in the selection area 82, the report generation section 120 determines that the condition of "NO" in S21 of FIG. 6 has been satisfied.

If such a method as described above is adopted, it is possible to prevent occurrence of an event in which a transmission report has been erroneously outputted. Moreover, it is possible to prevent occurrence of an event in which, although a user desires the output of a transmission report, the transmission report is not printed. In addition, a method just like that described above can be applied to the multi-address transmission. In this case, the method can be realized merely by causing the setting reception section 100 to, for each of destinations, display the message 810 and the selection area 820 on the confirmation screen 800, and receive a selection of an execution of printing or a non-execution of printing of the multi-address transmission report.

Modified Example 4

When having received an instruction for displaying a communication history via the operation panel 160, the setting reception section 100 may display the communication history on the operation panel 16. In this case, the setting reception section 100 may display communication history records, each having a setting content of the communication type 144, which indicates "TRANSMISSION" or "MULTI-ADDRESS TRANSMISSION", as a transmission history. Here, when displaying the transmission history, the setting content reception section 100 may determine whether each of the transmission history records is to be outputted, or not, in accordance with a transmission report setting corresponding to a destination regarding each of the communication history records. That is, if, as a result of referring to a setting content of the transmission report setting 163, which corresponds to a destination of each communication history record including a setting content of the communication type 144, which indicates "TRANSMISSION", the setting reception section 100 has recognized that the setting content of the transmission report setting 163 is set to "PROHIBIT", the setting reception section 100 may not display the communication history record. Similarly, if, as a result of referring to a setting content of the multi-address transmission report setting 164, which corresponds to a destination of each communication history record including a setting content of the communication type 144, which indicates "MULTI-ADDRESS TRANSMISSION", the setting reception section 100 has recognized that the setting content of the multi-address transmission report setting 164 is set to "PROHIBIT", the setting reception section 100 may not display the communication history record. In addition, the setting reception section 100 may display part of pieces of information, which is of a degree that does not result in specification of the destination being set to "PROHIBIT", such as a start date and time, a communication duration time, the number of sheets, and a communication result.

If such a method as described above is adopted, it is possible to enhance information security and convenience in browsing the communication history. In addition, the setting reception section 100 may allow specific users who have logged in by using their own passwords or the like to browse all the communication histories.

Modified Example 5

The facsimile control section 110 may determine whether a communication history is to be printed, or not, on the basis of transmission report settings. That is, after having transmitted a facsimile, if, as a result of referring to a setting content of the transmission report setting 163, which corresponds to a destination of the facsimile, the facsimile control section 110 has recognized that the setting content of the transmission report setting 163 is "PROHIBIT", the facsimile control section 110 may not record a communication record regarding the facsimile. In this way, it is possible to prevent a communication history corresponding to the content of a transmission report from being browsed directly from the operation panel 16 of the multi-function apparatus 1. Processing may be performed such that communication histories are recorded and browsing of the records thereof each being set to "PROHIBIT" is not allowed to users other than specific users (for example, those who have logged in by using their own passwords).

In addition, at least one of the modified examples described above may be appropriately combined. Further, any type of report is not limited to a target for printing in a facsimile apparatus, but may be a target for outputting and displaying in a prescribed computer, such as a PC or a server, connected to the facsimile apparatus via a network.

The entire disclosure of Japanese Patent Application No. 2011-084829, filed Apr. 6, 2011 is expressly incorporated by reference herein.

What is claimed is:

1. A facsimile apparatus that outputs a report regarding facsimile transmission, comprising:
   a storage section configured to store therein a common setting which specifies whether a report regarding facsimile transmission is to be outputted, or not, and a specific setting which specifies whether an output of the report regarding facsimile transmission is to be permitted, or not, for each of at least one destination of the facsimile transmission;
   a determination section configured to determine whether the report related to a facsimile transmission to at least one destination is to be outputted, or not, by applying the specific setting corresponding to the at least one destination in preference to the common setting; and
   an output section configured to, if it is determined that the report related to the facsimile transmission to the at least one destination is to be outputted, output the report including information related to the facsimile transmission to the at least one destination;
   wherein, if the common setting is set so as to allow the report to be outputted, and further, the specific setting corresponding to the at least one destination is set so as not to permit an output of the report, the determination section determines that the report related to the facsimile transmission to the at least one destination is not to be outputted.

2. The facsimile apparatus according to claim 1, wherein, if it is determined that the report related to the facsimile transmission to the at least one destination is not to be outputted, the output section does not output the report including information related to the facsimile transmission to the at least one destination, or the output section outputs the report not including at least part of information related to the facsimile transmission to the at least one destination.

3. The facsimile apparatus according to claim 1, further comprising a setting section configured to receive a setting change of the common setting and a setting change of the specific setting.

4. The facsimile apparatus according to claim 1, wherein, in the case where the report is a transmission report which is outputted when a facsimile transmission to one destination has been performed, if it is determined that the report related to the facsimile transmission to the one destination is not to be outputted, the output section does not output the report including information related to the facsimile transmission to the one destination.

5. The facsimile apparatus according to claim 1, wherein, in the case where the report is a multi-address transmission report which is outputted when a facsimile multi-address transmission to a plurality of destinations has been performed, if it is determined that the report related to the facsimile multi-address transmission to any of the plural of destinations is not to be outputted, the output section outputs the report not including at least part of information related to the facsimile multi-address transmission to the any of the plurality of destinations.

6. The facsimile apparatus according to claim 1, wherein, in the case where the report is a communication management report including information related to a facsimile transmission to at least one destination, if it is determined that the report related to the facsimile transmission to the at least one destination is not to be outputted, the output section outputs the report not including at least part of information related to the facsimile transmission to the at least one destination.

7. A facsimile apparatus that outputs a report regarding facsimile transmission, comprising:
   a storage section configured to store therein a common setting which specifies whether a report regarding facsimile transmission is to be outputted or not, and a specific setting which specifies whether an output of the report regarding facsimile transmission is to be permitted or not, for each of at least one destination of the facsimile transmission;

a determination section configured to determine whether the report related to a facsimile transmission to at least one destination is to be outputted or not, by applying the specific setting corresponding to the at least one destination in preference to the common setting;

an output section configured to, if it is determined that the report related to the facsimile transmission to the at least one destination is to be outputted, output the report including information related to the facsimile transmission to the at least one destination; and a display section configured to prompt a user to confirm whether an output of the report is to be permitted or not, by displaying the specific setting corresponding to the at least one destination of the facsimile transmission;

wherein, if a telephone number of an inputted destination is already registered and there is a prescribed relation between the common setting and the specific setting corresponding to the inputted destination, the display section displays the specific setting corresponding to the destination.

8. The facsimile apparatus according to claim 7, wherein the prescribed relation is a case where the output setting which corresponds to the transmission report is enabled and a setting content of the transmission report setting which corresponds to the destination is prohibited.

9. A facsimile apparatus that outputs a report regarding facsimile transmission, comprising:

a storage section configured to store therein a common setting which specifies whether a report regarding facsimile transmission is to be outputted or not, and a specific setting which specifies whether an output of the report regarding facsimile transmission is to be permitted, or not, for each of at least one destination of the facsimile transmission;

a determination section configured to determine whether the report related to a facsimile transmission to at least one destination is to be outputted or not, by applying the specific setting corresponding to the at least one destination in preference to the common setting;

an output section configured to, if it is determined that the report related to the facsimile transmission to the at least one destination is to be outputted, output the report including information related to the facsimile transmission to the at least one destination;

a storage section configured to store therein a communication history related to at least one facsimile transmission; and a communication history display section configured to, on the basis of the specific setting corresponding to a destination of each of the at least one facsimile transmission, display a communication history related to any of the at least one facsimile transmission, which corresponds to a destination for which the specific setting is set so as to permit an output of the report.

10. The facsimile apparatus according to claim 1, further comprising:

a storage section configured to store therein a communication history related to at least one facsimile transmission; and a communication history display section configured to, on the basis of the specific setting corresponding to a destination of each of the at least one facsimile transmission, display a communication history related to any of the at least one facsimile transmission, which corresponds to a destination for which the specific setting is set so as to permit an output of the report.

11. The facsimile apparatus according to claim 7, further comprising:

a storage section configured to store therein a communication history related to at least one facsimile transmission; and a communication history display section configured to, on the basis of the specific setting corresponding to a destination of each of the at least one facsimile transmission, display a communication history related to any of the at least one facsimile transmission, which corresponds to a destination for which the specific setting is set so as to permit an output of the report.

12. The facsimile apparatus according to claim 7, wherein, if an abbreviated number is inputted as a destination and there is a prescribed relation between the common setting and the specific setting regarding the destination corresponding to the abbreviated number, the display section displays the specific setting regarding the destination.

* * * * *